United States Patent [19]
Holden et al.

[11] 3,929,957
[45] Dec. 30, 1975

[54] METHOD FOR PRODUCING A CONTINUOUS FLEXIBLE REINFORCED TUBULAR CONDUIT

[75] Inventors: Homer N. Holden, Sylva; James P. Hunt, Clyde; Vernon D. Browning, Waynesville; Edward L. Hoglen, Candler, all of N.C.; Donald L. Kleykamp, Springboro, Ohio

[73] Assignee: Dayco Corporation, Dayton, Ohio

[22] Filed: Mar. 5, 1975

[21] Appl. No.: 555,493

[52] U.S. Cl. .............. 264/150; 264/149; 264/159; 264/163; 264/166; 264/172; 264/173; 264/174; 264/177 R; 264/209; 264/271; 264/281; 264/339

[51] Int. Cl.² ............ B29B 21/52; B29B 21/56; B29C 17/14

[58] Field of Search ............ 264/148–150, 264/172, 174, 171, 173, 209, 177 R, 159, 339, 166, 285, DIG. 52, 163, 271; 425/112–114, 132, 324

[56] References Cited

UNITED STATES PATENTS

| | | | |
|---|---|---|---|
| 2,561,569 | 7/1951 | Flynn | 264/163 |
| 2,599,493 | 6/1952 | Slaughter | 264/150 |
| 3,249,663 | 5/1966 | French | 264/173 |

*Primary Examiner*—Willard E. Hoag
*Attorney, Agent, or Firm*—Reuben Wolk

[57] ABSTRACT

A method of producing a continuous flexible reinforced tubular conduit is provided and utilizes a plurality of elongated rigid mandrels each having a non-yielding outside surface and such mandrels are moved continuously through a fabrication area while operatively associated in aligned end-to-end relation where at least one wire is formed around the mandrels in a continuous non-rotating helical coil. An extruder head is provided and extrudes a plastic tube around the coil which is urged and bonded thereagainst to define a conduit whereupon the conduit is subsequently separated from its associated mandrel.

4 Claims, 9 Drawing Figures

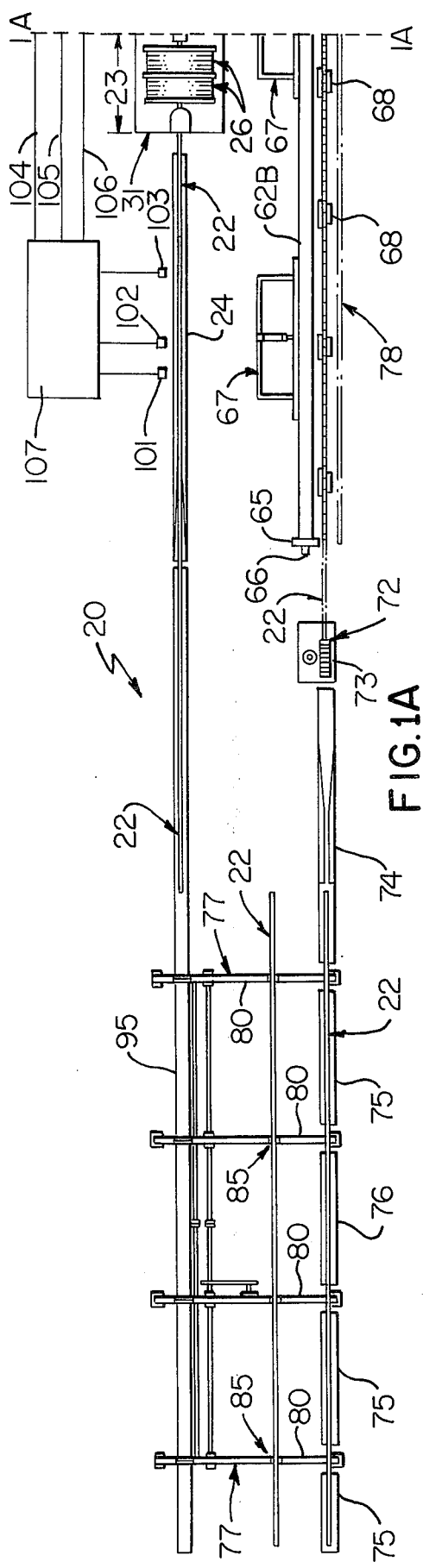
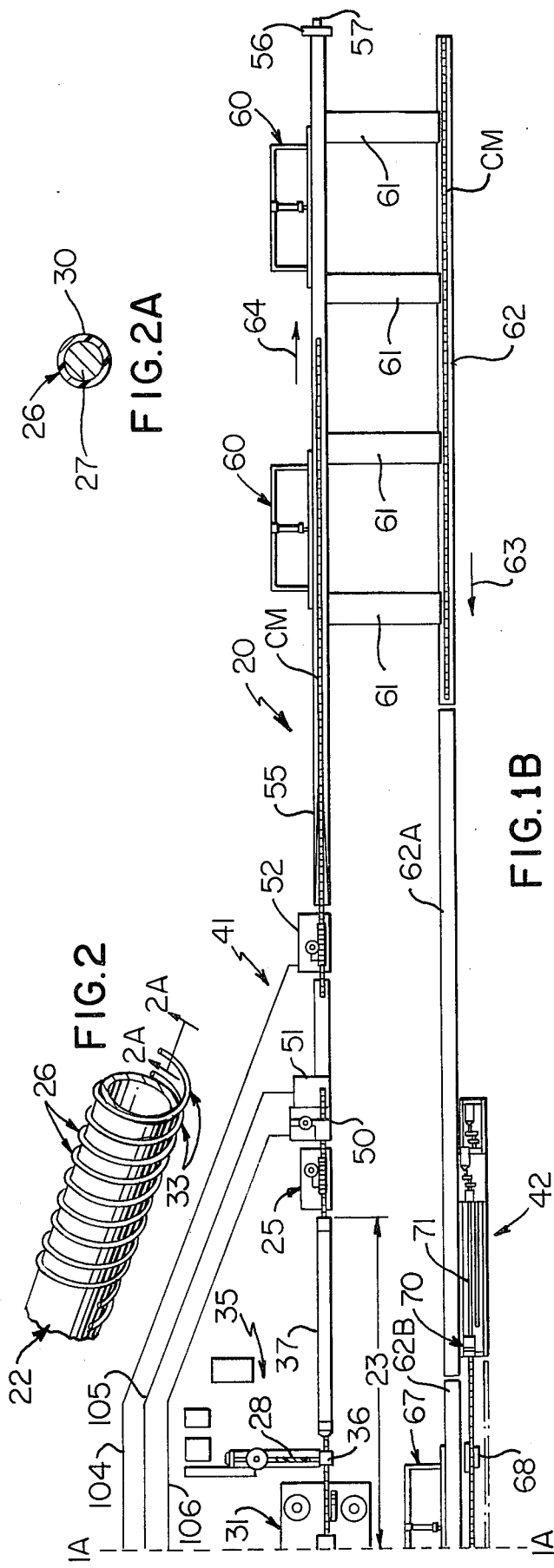
FIG.1A
FIG.2
FIG.2A
FIG.1B

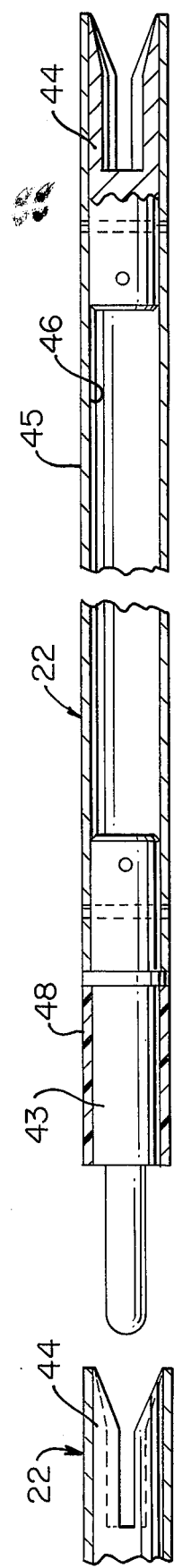
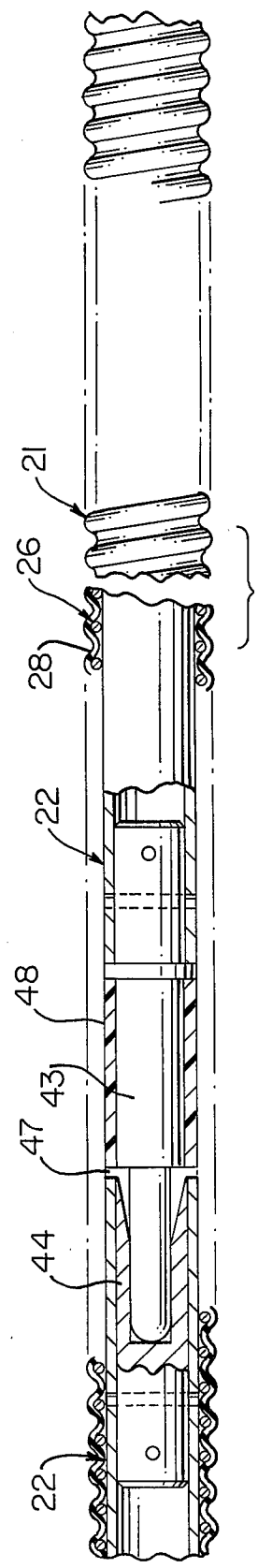
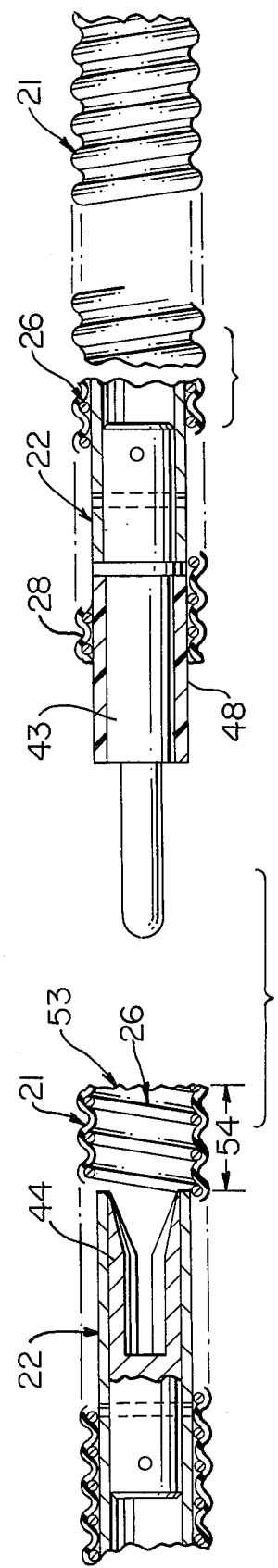
FIG. 3
FIG. 4
FIG. 5

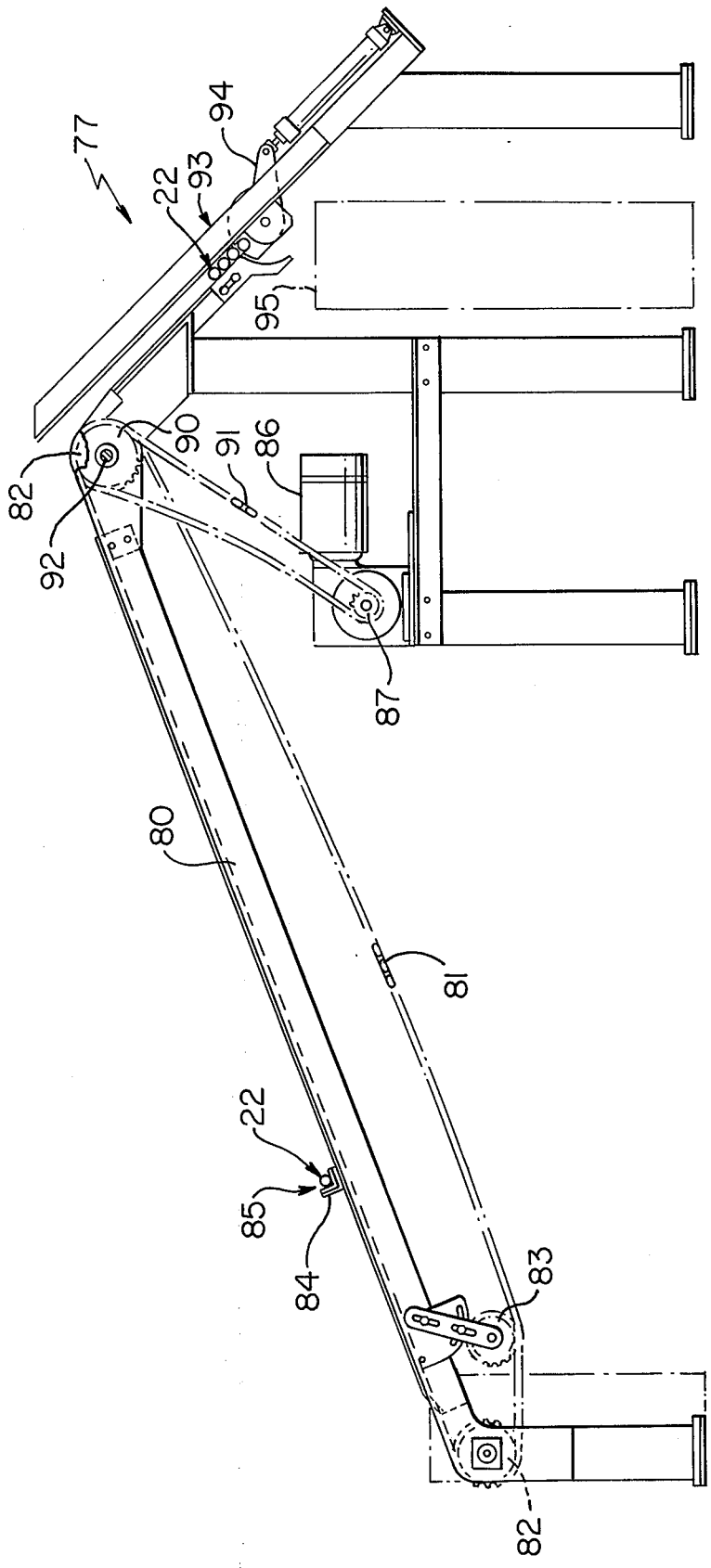
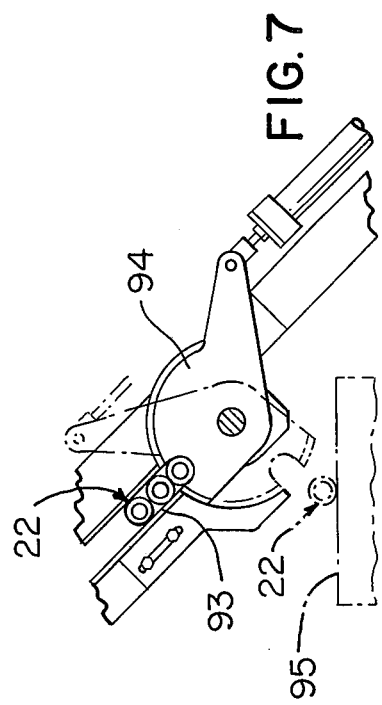
FIG. 6
FIG. 7

METHOD FOR PRODUCING A CONTINUOUS FLEXIBLE REINFORCED TUBULAR CONDUIT

BACKGROUND OF THE INVENTION

Flexible reinforced tubular conduits are in wide use throughout industry whereby numerous manufacturers are engaged in making and selling such conduits, resulting in a highly competitive industry.

Conduits of this type are often used as vacuum cleaner hoses or conduits and a typical vacuum cleaner conduit is made of a reinforcing wire which has a plastic sleeve therearound and is formed in a continuous non-rotating helical coil having axially spaced coils or turns and a compatible plastic tube is extruded therearound and bonded to the outside surface of the wire sleeve to form a reinforced conduit. This type of conduit is a flexible vacuum cleaner conduit in its simplest form; however, it will be appreciated that additional reinforcements, such as fabric or other reinforcements, may be placed concentrically around the tube in one or more layers and in accordance with techniques known in the art.

The basic problem encountered with apparatus and methods proposed heretofore in continuously forming such flexible conduits is that the reinforcing wire which is plastic sleeve convered and the plastic tube ordinarily extruded therearound are not suitably supported internally throughout the entire fabrication cycle comprised of helically coiling the wire, extruding a plastic tube around the coiled wire causing bonding of the tube and wire to define a conduit, and cooling the conduit whereby the coil diameter of the helically coiled wire cannot be precisely controlled and the wall thickness and diameter of the extruded tube cannot be precisely controlled resulting in a conduit which has a non-uniform wall thickness and thus weak areas at various locations therealong.

SUMMARY

This invention provides an improved apparatus for and method of producing a flexible reinforced tubular conduit of high quality and in a continuous manner by overcoming the above-mentioned problems. The apparatus and method utilizes a plurality of rigid mandrels and means for moving the mandrels continuously through a fabrication area. A wire forming machine is provided in the area for forming at least one wire and in this example the machine forms a plurality of two wires into continuous non-rotating helical coils about the mandrels. An extruder head is also provided in the area downstream of the wire forming means and has means for receiving a plastic material in a flowable condition with the moving means being adapted to move each mandrel with the helical coils therearound through the extruder head at a speed correlated with the speed of forming the helical coils. The extruder head has means therein for forming a tube of plastic material around the coils and mandrel to define the conduit which is then cooled in a cooling chamber; and, the conduit is then separated from each mandrel and the mandrels are reused.

Other details, uses, and advantages of this invention will be readily apparent from the exemplary embodiments thereof presented in the following specification, claims, and drawings.

BRIEF DESCRIPTION OF THE DRAWINGS

The accompanying drawings show present exemplary embodiments of this invention, in which FIGS. 1A and 1B present a plan view of the improved apparatus and method of this invention with FIG. 1B being, in essence, an extension of FIG. 1A upon superimposing line 1A—1A of FIG. 1B on the line 1A—1A of FIG. 1A;

FIG. 2 is a fragmentary perspective view particularly illustrating that the wire forming machine comprising the apparatus of FIGS. 1A and 1B is particularly adapted to form a plurality of two reinforcing wires in a simultaneous manner into two continuous non-rotating helical coils each of a precise diameter about an associated mandrel;

FIG. 2A is a greatly enlarged cross-sectional view taken essentially on the line 2A—2A of FIG. 2;

FIG. 3 is a view with parts in cross section, parts in elevation, and parts broken away of mandrel means in the form of a plurality of two elongated rigid tubular mandrels particularly illustrating one of the mandrels with the central portion broken away and connecting means in the form of male and female connectors at opposite ends of the one mandrel and showing another mandrel with its female connector disconnected from the associated male connector of the one mandrel;

FIG. 4 is a view similar to FIG. 3 illustrating the two mandrels of FIG. 3 with their associated connectors connected and illustrating a tubular conduit which has been formed around the connected mandrels prior to severing thereof opposite an associated male connector;

FIG. 5 is a view similar to FIG. 4 particularly illustrating the severed conduit around the male connector of the one mandrel and outwardly beyond the female connector of the other mandrel;

FIG. 6 is an end view of a mandrel transfer apparatus provided to introduce used mandrels into the apparatus for reuse after they have been stripped of their conduits; and FIG. 7 is a fragmentary view of a mandrel dispensing device of the apparatus of FIG. 6.

DETAILED DESCRIPTION

Reference is now made to FIGS. 1A and 1B of the drawings which illustrate one exemplary embodiment of the apparatus and method of this invention which is designated generally by the reference numeral 20 with such apparatus and method being particularly adapted to produce a flexible reinforced tubular conduit in a continuous manner and such conduit is designated generally by the reference numeral 21 in FIGS. 4 and 5 of the drawings. The conduit 21 is formed in a continuous manner using rigid mandrel means which comprises the apparatus 20 and such rigid mandrel means is in the form of a plurality of elongated rigid mandrels 22 which are operatively associated with each other in aligned end-to-end relation.

The apparatus 20 has what will be referred to as a fabrication area through which the mandrels 22 are moved in a continuous rectilinear path while operatively associated or connected and such area is designated by the double arrow 23 in each of FIGS. 1A and 1B. The mandrels 22 are moved through the fabrication area 23 in a continuous manner by moving means which in this example comprises a belt conveyor 24 and an upstream or first puller 25.

The conduit 21 of this example is particularly adapted for use as a vacuum cleaner conduit or hose and comprises a pair of helically wound reinforcing wires 26 and an outer plastic tube 28 formed preferably by extrusion around the wires while being bonded thereagainst. Each wire 26 is also capable of serving as an electrical conductor and each wire has a central electrically conductive core 27 made of a metallic material and an outer wire sleeve 30 made of a plastic material in the form of an electrical insulating material.

The apparatus 20 has suitable wire forming means in the form of a wire forming or coiling machine which is designated generally by the reference numeral 31 whereby a pair of wires 26 are formed into a pair of continuous non-rotating coils each designated by the reference numeral 33. The coils 33 are illustrated in an exaggerated manner in FIG. 2; and, are formed by the machine 31 against the mandrel 22 enabling forming thereof in a precise manner.

The apparatus 20 also has suitable means for forming the plastic tube around and against helical coils 33, particularly against the outer portions of the plastic sleeves 30 of such coils 33; and, in this example such forming means is in the form of an extrusion apparatus 35 having an extruder head 36 which is provided in the fabrication area 23 downstream of the wire-forming machine 31. The extruder head 36 has suitable means therein for receiving an elastomeric material preferably in the form of a plastic material which is designated by the same reference numeral 28 as the plastic tube comprising the conduit 21 and such plastic material 28 is received in a flowable condition and extruded in tubular form around the coils 31 and an associated mandrel 22.

The moving means through the fabrication area 23 comprises the previously mentioned conveyor 24 and puller 25 and such conveyor and puller are particularly adapted to move each mandrel 22 with helical coils 33 therearound through the extruder head 36 at a speed correlated with the speed of forming the helical coils 33. The helically wound coils 33 with the plastic tube 27 extruded thereagainst are suitably bonded together by fusion between the hot semi-molten inside surface of the tube 28 as it engages the outside surface of the plastic sleeve 30 of the reinforcing wire 26.

The apparatus 20 has suitable means associated with the extruder head and provided for urging the hot plastic tube 28 after extrusion thereof around and against the helical coils 33. The urging means comprises vacuum means associated with the extruder head and may be of the type disclosed in U.S. Pat. No. 3,725,178 and the disclosure of this patent is incorporated herein by reference.

The apparatus 20 also has cooling means in the form of a cooling apparatus or chamber 37 which cools the hot plastic tube 28 which has been heat fused at its points of contact with the plastic sleeve 30. The cooling apparatus 37 may be of any suitable type commonly used in the art and preferably is in the form of either a trough filled with cold tap water or a chamber having spray nozzles therein each of which directs a spray of water against the hot plastic tube as it exits the extruding machine 35. The separating means of the apparatus 20 also includes means for removing a particular length of tubular conduit from around the mandrel means and in particular from around each associated mandrel; and, the removing means is designated generally by the reference numeral 42. The severing means or apparatus 41 and removing means or apparatus 42 are the subject of separate inventions and applications which are being filed concurrently with the present application as applications Ser. Nos. 555,492 and 555,491 respectively.

As will be readily apparent from FIGS. 3-5 of the drawings, the mandrel means or mandrels 22 have means for connecting associated ends thereof in aligned relation and such connecting means comprises a male connector 43 and a female connector 44 at opposite ends of each mandrel 22 with the male connector 43 of one mandrel 22 being adapted to be connected to the female connector of an adjoining mandrel 22. The associated male and female connectors 43 and 44 are brought together during operation of the apparatus and fit together with a loose fit therebetween; however, the associated male and female connectors are held together by the precise control of the movement of each set of a forward and a rear mandrel during the forming of coils 33 therearound and the extrusion of tube 28 over the coils and mandrel.

Each of the mandrels 22 is a substantially rigid mandrel in that it is made of a comparatively hard nonyielding material such as metal, a hard plastic, or the like, and in this example each mandrel 22 is preferably in the form of a tubular mandrel which has a substantially right circular cylindrical outside surface 45 and a similar right circular cylindrical inside surface 46. As best seen in FIG. 4 of the drawings, the connectors 43 and 44 connect associated mandrels 22 so that their cylindrical outside surfaces 45 are arranged in aligned relation and in essence define one substantially continuous cylindrical surface as the mandrels pass through the fabrication area with the exception that a small annular gap 47 may be provided between a connected male connector 43 and female connector 44 to prevent damage to adjoining cylindrical surfaces.

The severing apparatus 41 is the subject of another patent application as mentioned earlier; however, a brief general description of such apparatus will now be made herein with particular reference to FIG. 1B. The apparatus 41 comprises a cutter 50 for cutting a plurality of helical turns of wire opposite an associated connector preferably a male connector 43 as the connector moves past the cutter. The cutter 40 may be of any suitable type, such as a rotary cutting blade or abrasive cutoff wheel, (not shown) which operates at high speed and cuts through a plurality of turns 33 of the wires 26. To assure efficient cutting the male connector 43 serves as a back-up anvil during the cutting action and as shown in FIGS. 3 and 4 has an elastomeric or resilient plastic sleeve 48 therearound which is engaged by the cutter 40 to prevent premature dulling thereof.

The apparatus 41 also comprises a heater 51 for heating the plastic material comprising the tube portion 28 of the conduit 21 at a location adjacent the cut helical turns of the wire 26 and the heater heats the plastic material of the tubular conduit to a temperature approaching the melt temperature of such plastic material. The plastic material is heated for the purpose of enabling it to be physically pulled apart in a comparatively easy manner.

The severing apparatus 41 also includes means for pulling the heated plastic material apart in the heated area and such pulling means comprises the previously described puller 25 as well as a second puller 52 and as will be described in more detail later.

The conveyor 24 and puller 25 operate to move each mandrel 22 through the wire forming or winding machine 31, extruder 35, and cooling chamber 37 allowing the conduit to be formed along the full length thereof. After such conduit 21 has been formed and as each female connector 44 moves through cutter 50 a plurality of wire turns are cut by such cutter 50. As the cut wire turns enter the heater, the plastic tube therearound is heated and partially molten. At this point a signal is provided to the puller 52 causing it to pull the preceding mandrel faster than the speed that the belt 24 and puller 25 are moving the mandrel having cut wire turns and the partially molten portion at its forward end whereby the partially molten portion of plastic is literally pulled apart.

This process is repeated as each female connector 44 moves through the cutter 50 and heater 41 so that the continuously formed conduit 21 is cut on opposite sides of each mandrel 22 whereby each mandrel 22 has conduit 21 therearound corresponding to its length. Once the puller 52 pulls the molten plastic apart the conduit 21 has the general appearance indicated at 53 in FIG. 5 and a conduit portion 54 shown slightly exaggerated in length extends beyond the female connector 44.

Each mandrel 22 with a covering of conduit 21 therearound corresponding to its length is then introduced onto a belt conveyor 55 and such mandrel will be referred to as a conduit covered mandrel or simply as a covered mandrel, hereinafter designated by the reference letters CM. The conveyor 55 continues movement of the conduit covered mandrel toward and against an end stop 56 which actuates an electrical limit switch 57 which in turn activates a pair of pusher assemblies 60 which operate in unison and simultaneously push each conduit covered mandrel onto a plurality of parallel conveyors 61 which move the conduit covered mandrel onto a belt conveyor 62 which moves the conduit covered mandrel in a direction 63, see arrow in FIG. 1B, opposite from the direction 64 in which it was originally moving.

The conveyor 62 continues movement of the conduit covered mandrel CM onto conveyor 62A and then onto conveyor 62B which moves the conduit covered mandrel CM until its forward end strikes a stop 65, see FIG. 1A, which actuates an electrical limit switch 66 which in turn activates another pair of pusher assemblies 67. The pusher assemblies 67 also operate in unison and move the conduit covered mandrel so that it is picked up by the mandrel removing apparatus 42 which operates to remove the mandrel 22 from within its surrounding length of conduit 21.

The mandrel removing apparatus 42 is the subject of another application as mentioned above; however, the operation thereof will now be described briefly. In particular, the conduit covered mandrel is pushed by the pusher assemblies so that it is received in a plurality of spaced rectilinearly aligned thoughs 68 whereupon one end thereof is grasped by a clamp assembly 70.

The clamp assembly holds the conduit 21 while a rod 71 of the apparatus 42 rotates the mandrel a few turns against the direction of the helix angle of the wires 26 causing radial expansion of the conduit a few thousandths of an inch. After this small radial expansion the rod 71 pushes the mandrel 22 whereby one end of the conduit 21 remains firmly held by the clamp assembly 70 while the rod 71 literally pushes the mandrel out until the forward end thereof shown by dotted lines at 72 in FIG. 1A is grasped by a third puller 73 which grasps the forward end of the mandrel 22 and pulls the stripped mandrel 22 onto another belt conveyor 72. The puller 73 serves to also rotate each mandrel to facilitate its rectilinear movement from within its conduit.

The belt conveyor 74 moves the stripped mandrel onto a plurality of aligned conveyor assemblies comprised of roller assemblies 75 and a belt conveyor 76 between the first two roller assemblies 75. The roller assemblies 75 and belt conveyor 76 move each mandrel 22 in position to be picked up by a mandrel lateral transfer apparatus 77 as will now be described particularly in connection with FIGS. 1A, 6 and 7. The length of conduit 21 which has been stripped or removed from its mandrel by the apparatus 42 is pushed away from the apparatus 42 by the trough members 68 thereof as shown at 78 in FIGS. 1A and 1B for pick up and further processing.

The mandrel lateral transfer apparatus 77 has a plurality of inclined supports 80 which are arranged in parallel spaced-apart relation and the number of supports 80 and their spacing is correlated with the length of the mandrel and in this example since the mandrels are 50 feet in length, a plurality of four inclined supports 80 are provided and spaced approximately 12 feet apart. As best seen in FIG. 6, each inclined support has an endless sprocket chain 81 which is supported about toothed sprockets 82 at opposite ends thereof and a chain tension controlling sprocket 83 and each sprocket chain has an angle-shaped mandrel supporting or carring member 84 which is particularly adapted to be moved in position around an elongated mandrel 22 to move the mandrel upwardly along the inclined supports 80 as illustrated at 85 in FIGS. 1A and 6.

The endless sprocket chains 81 are adapted to be moved about their endless paths by a single drive motor 86 which is operatively connected to a sprocket wheel 87 which in turn is connected to a sprocket wheel 90 by means of another sprocket chain 91 and the sprocket wheel 90 is fixed to a drive shaft 92 which has the toothed sprocket wheels 82 at the upper ends of the inclined supports 80 suitably fixed thereto for rotation therewith. Upon rotation of the shaft 92 by the drive motor 86 such shaft 92 drives the upper sprocket wheels 82 in a simultaneous manner to move the sprocket chains 81 about their endless paths to thereby simultaneously move the supporting members 84 into engagement with each mandrel 22 for movement of the mandrel 22 upwardly along the inclined supports 80.

Once the mandrel 22 reaches the top of the inclined supports 80 it slides under the influence of gravity along an inclined support of a mandrel storing and dispensing device 93 and the device 93 has a mechanism 94 for serially dispensing each mandrel onto a belt conveyor 95. The belt conveyor 95 conveys each mandrel 22 so that it is picked up by the conveyor 24.

The dispensing of a mandrel 22 by the storage and dispensing device 93 is suitably controlled either automatically or manuall. Each mandrel 22 is suitably dispensed and the speeds of conveyors 95 and 23 are such that each newly dispensed mandrel, in essence, moves into interconnected position with its female fitting 44 around the male fitting 43 of the preceeding mandrel before such male fitting 43 moves into the fabrication area. This assures a steady flow of mandrel means defined by interconnected rigid mandrels 22 each 50 feet long through the fabrication area.

Having described the apparatus and method 20 in detail, the description will now proceed with an overall description of the manner in which flexible reinforced tubular conduit particularly adapted for use as a vacuum cleaner hose may be formed using the rigid mandrels of substantial length and in a manner heretofore unknown. Accordingly, the mandrel dispensing device 93 is provided with a suitable signal causing an actuator of such device 93 to extend its rod portion to the dotted line position of FIG. 7 and serially dispense a single mandrel 22 and the manner in which the dispensing action is achieved will be readily apparent from the drawing. The dispensed mandrel drops under the influence of gravity onto the conveyor 95 which transfers or moves such mandrel 22 so that it is picked up and moved by conveyor 24 into the fabrication area 23.

In the fabrication area 23 the wire forming or coiling machine 31 wraps or coils two wires 26 each into a helical coil 33 and the coiling of the two wires 26 is achieved in a simultaneous manner. As explained earlier, the wires 26 have outer sleeves 30 made of plastic material.

The mandrel 22 is then passed through the extrusion head 36 of the extrusion apparatus 35 which extrudes a plastic tubular sleeve or tube 28 concentrically around and against the helical coils 33 of the wires 26 to define the conduit 21. The mandrel with its newly formed conduit 21 is then passed through the cooling chamber 37 which cools the conduit 21.

The mandrels 22 are fed through the fabrication area 23 with the female connector 44 thereof being at the front end of the moving mandrel and in a manner previously suggested above. Each mandrel 22 is dispensed by the dispensing apparatus or device 93 so that the female connector 44 of a newly dispensed mandrel is interconnected with the trailing male connector 43 of the mandrel 22 just passing through the fabrication area 23 to assure a continuous uninterrupted flow of mandrels through such fabrication area 23.

As each mandrel 22 with the conduit thereon moves out of the fabrication area 23, the male connector 43 at its trailing end energizes a series of electrical switches 101, 102, and 103 which are connected by suitable electrical lines 104, 105, and 106 through a control console 107 to the cutter 50, heater 51, and puller 52 respectively. The switches 101, 102, and 103 may be fenomagnetic proximity switches which sense the non-ferrous sleeve 48 and the member 43 may also be made of non-ferrous material. The signal from the switch 101 signals the cutter 50 to cut the coils 33 in the manner previously mentioned. The signal from the switch 102 signals the heater 51 causing heating elements of such heater to heat the tube 28 adjoining and immediately adjacent the cut coils 33 to provide partial melting thereof or at least heating thereof to a semi-plastic condition. As the mandrel 22 with its trailing male connector 43 continues to be moved by the conveyor 24, the signal from the switch 103 signals the puller 52 causing such puller to speed up its movement for a predetermined time increment determined by suitable control means associated with the puller 52 (such as a photoelectrically operated switch means downstream of the puller, for example,) whereby the increased speed of the leading mandrel 22 causes the male connector 43 to be pulled away from the female connector 44 of the comparatively slower moving trailing mandrel 22 and causing the plastic tube 28 to be literally pulled apart or severed in the heated area near the cut coils so it has the appearance as shown at 53 in FIG. 5. The switches 101, 102, and 103 may be of any suitable type and preferably such switches are such that they sense the material used in making the male connectors 43 as each connector 43 moves therepast, in a manner as suggested earlier, causing the signal to be supplied through the controller 107 to an associated apparatus, either cutter 50, heater 51, or puller 52.

At this point in the operation of the apparatus and method 20 of this invention, a particular mandrel 50 feet in length has a conduit 21 concentrically therearound and such conduit covered mandrel CM is conveyed by a conveyor 55 until the end thereof strikes a stop 56 which actuates a limit switch 57 which in turn energizes a pair of pusher assemblies 60 to laterally transfer the conduit covered mandrel CM onto a plurality of four conveyors 61 which move the conduit covered mandrel onto a conveyor 62 which moves in an opposite direction from the movement of the conveyor 55. The conveyor 62 moves each conduit covered mandrel CM onto a conveyor 62A which in turn moves the conduit covered mandrel onto a conveyor 62B. The conveyor 62B moves the conduit covered mandrel until the forward end thereof hits a stop 65 which actuates another limit switch 66 which in turn simultaneously actuates two pusher assemblies 67 which move the conduit covered mandrel across the belt conveyor 62B onto trough-like components 68 of the mandrel removing apparatus 42. As the conduit covered mandrel is received onto members 68, a clamping device 70 of the apparatus 42 is automatically actuated causing the trailing end of the conduit 21 to be grasped and enabling the apparatus 42 to remove the mandrel 22 from within the conduit 21. As the mandrel 22 starts to be pushed out of the conduit 21, it is picked up by the third puller assembly 73 whereupon such now-stripped mandrel is moved to the conveyor 74 and in turn to the conveying devices 75 and 76 associated with the mandrel lateral transfer apparatus 77 for transfer of the mandrel 22 to the storage and dispensing device 93 and in the manner previously described so that the mandrel may be reused.

The conduit 21 is now free of its mandrel and is still held by the clamp device 70 at one end thereof and supported along its length by the components 68. At this point, a suitable signal is provided from the apparatus 42 signalling its components to drop the conduit 21 as shown at 78 for pickup and further processing.

In this disclosure of the invention, it will be noted that many of the components illustrated in the drawings have been shown without suitable supports, support structure, and the like; however, it will be appreciated that such components may be supported in any suitable manner known in the art.

Reference has also been made herein to the fact that the tube 28 of conduit 21 and the sleeve 30 comprising each wire 26 are made of a suitable plastic material; however, components 28 and 30 are preferably made of thermoplastic material which are commonly used in the industry and compatible with each other.

The apparatus and method of this invention is fully applicable to mandrels 22 ranging from about 2 to 100 feet in length and is also fully applicable to flexible conduits 21 which do not have helically wound reinforcing wires or members.

If desired each mandrel 22 may have its outside surface suitably coated or treated with an anti-friction material which serves as a slipping agent and allows the mandrel 22 to be more readily slid from within its conduit 21.

In this disclosure of the invention it will be appreciated that various electrical devices, switches, controls, and the like normally used for controlling the various components which have been described herein have not been illustrated and, the usual control consoles, sources of power, electrical connections, and the like have not been illustrated either. However, it is to be understood that these items as well as all required devices and components used therewith would be provided in accordance with techniques which are well known in the art.

In this disclosure of the invention it will be seen that a reinforced flexible tubular conduit 21 is shown and described as being made primarily of synthetic plastic materials. However, it will be appreciated that the conduit 21 and in particular the tube portion thereof may be made primarily of any suitable elastomeric material in the form of either a plastic material, or a rubber compound or a synthetic rubber compound of any suitable type.

It will also be appreciated that the flexible conduit 21 may have only one or a plurality of more than two reinforcing wires or member 26 which are helically wound and provided with or without a sleeve therearound. Further, the flexible conduit 21 may be reinforced by any other suitable means well known in the art.

Reference has been made in this disclosure to the use of pulling devices or pullers 25, 52 and 73. These pullers may be of any suitable known construction and may have cooperating beltlike structures or rollers which are urged against and engage opposed surfaces of the conduit covered mandrel CM. The belt-like structures or rollers rotate in opposite directions and cooperate once frictionally urged against the conduit covered mandrel CM to pull or move the conduit covered mandrel CM in the manner previously described. Typical pullers of this type are manufactured by the Gatto Machinery Development Corporation, 134 Rome St., Farmingdale, N.Y., 11735. Model No. 207 CAT-A-PULLER made by this company may be used as pullers 25 and 52 and Model No. 846 CAT-A-PULLER may be used as puller 73.

The mandrel 22 is shown herein as being in the form of a tubular mandrel; however, it will be appreciated that such a mandrel need not necessarily be tubular but may be of a substantially solid cross-sectional configuration provided such a solid mandrel is also rigid and has a comparatively rigid outside surface.

As previously suggested, the apparatus and method of this invention preferably employ mandrels which are about 50 feet long which are used in making vacuum cleaner conduits 21; however, it will be appreciated that the apparatus and method of this invention may be utilized in making all types of substantially flexible conduits such as automobile radiator hoses as well as hoses used to convey all types of fluid.

Reference has been made in this disclosure to the forward or leading mandrel, the rear or trailing mandrel, etc. However, it is to be understood that these words have been used to describe the movement of mandrels 22 as they move through the system 20 and the apparatus 30.

In this disclosure of the invention reference has been made to the use of limit switches (switch 57, for example) at various locations; however, it is to be understood that any suitable switch means may be used. For example, photoelectric devices have been used successfully.

While present examplary embodiments of this invention and methods of practicing the same, have been illustrated and described, it will be recognized that this invention may be otherwise variously embodied and practiced within the scope of the following claims.

What is claimed is:

1. A method of producing a continuous flexible reinforced tubular conduit comprising the steps of, operatively associating a plurality of rigid mandrels is aligned end-to-end relation, moving said operatively associated mandrels in a continuous manner through a fabrication area using associated moving means, forming at least one elongated member into a continuous non-rotating helical coil about each mandrel as it moves through said area, said moving step comprising moving each mandrel with its helical coil therearound through an extruder head of an extrusion apparatus at a speed correlated with the speed of forming said helical coil, extruding a tube of plastic material around said coil and mandrel as it moves through said extruder head to define said conduit, and separating said conduit from each of said mandrels.

2. A method as set forth in claim 1 and further comprising the step of cooling said plastic tube in a cooling chamber downstream of said extruder head.

3. A method as set forth in claim 1 in which said separating step comprises severing said conduit adjacent opposite ends of each of said mandrels and pulling each of said mandrels apart so that each mandrel has a length of conduit therearound which corresponds to the length of the mandrel.

4. A method as set forth in claim 3 in which said separating step comprises removing each mandrel from within its associated length conduit.

* * * * *